US010061660B1

(12) United States Patent
Jagannatha et al.

(10) Patent No.: US 10,061,660 B1
(45) Date of Patent: Aug. 28, 2018

(54) CROSS-PLATFORM INSTANT GRANULAR RECOVERY FOR VIRTUAL MACHINE BACKUPS

(71) Applicant: EMC IP Holding Company LLC, Hopkinton, MA (US)

(72) Inventors: Manjunath Jagannatha, Bangalore (IN); Kiran Mv Kumar, Bangalore (IN); Ravi Shankar Panem, Bangalore (IN); Sridhar Surampudi, Bengaluru (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 317 days.

(21) Appl. No.: 14/924,636

(22) Filed: Oct. 27, 2015

(51) Int. Cl.
G06F 11/00 (2006.01)
G06F 11/14 (2006.01)
G06F 17/30 (2006.01)
G06F 9/455 (2018.01)

(52) U.S. Cl.
CPC ...... G06F 11/1469 (2013.01); G06F 9/45558 (2013.01); G06F 11/1453 (2013.01); G06F 11/1464 (2013.01); G06F 17/30194 (2013.01); G06F 17/30233 (2013.01); G06F 2009/45583 (2013.01); G06F 2201/815 (2013.01)

(58) Field of Classification Search
None
See application file for complete search history.

(56) References Cited

U.S. PATENT DOCUMENTS

| 5,210,866 | A  | 5/1993  | Milligan  |
| 6,408,314 | B1 | 6/2002  | Liu       |
| 6,618,794 | B1 | 9/2003  | Sicola    |
| 7,321,962 | B1 | 1/2008  | Fair      |
| 7,689,623 | B1 | 3/2010  | Liu       |
| 7,797,279 | B1 | 9/2010  | Starling  |
| 8,099,391 | B1 | 1/2012  | Monckton  |
| 8,099,572 | B1 | 1/2012  | Arora     |
| 8,117,168 | B1 | 2/2012  | Stringham |
| 8,200,637 | B1 | 6/2012  | Stringham |
| 8,239,348 | B1 | 8/2012  | Bezbaruah |
| 8,386,733 | B1 | 2/2013  | Tsaur     |
| 8,539,008 | B2 | 9/2013  | Faith     |
| 8,600,937 | B1 | 12/2013 | Ravan     |
| 8,650,162 | B1 | 2/2014  | Vaikar    |
| 8,719,286 | B1 | 5/2014  | Xing      |
| 8,738,871 | B1 | 5/2014  | Naftel    |
| 8,949,829 | B1 | 2/2015  | Xing      |

(Continued)

Primary Examiner — Wilson Lee
(74) Attorney, Agent, or Firm — Staniford Tomita LLP

(57) ABSTRACT

Embodiments provide granular recovery of virtual machine backups by generating the virtual machine backups comprising virtual disks that are configured as iSCSI targets; exposing, with an iSCSI server, the virtual disks as a logical unit number to an iSCSI client; performing SCSI read operations from the virtual disk using defined application program interfaces (APIs); and mounting a backup save set comprising the virtual disk files as a local disk on a computer where data recover is to be performed. Embodiments also emulate virtual disk storage as an iSCSI target by exposing the virtual disk as a logical unit number to an iSCSI client and mounting a backup save set as a local disk in an iSCSI server executing a backup process defining a granularity for data restore operations.

16 Claims, 7 Drawing Sheets

(56) References Cited

U.S. PATENT DOCUMENTS

| | | |
|---|---|---|
| 8,983,952 B1 | 3/2015 | Zhang |
| 8,990,164 B1 | 3/2015 | Mahajan |
| 8,990,815 B1 | 3/2015 | Kalekar |
| 8,996,468 B1 | 3/2015 | Mattox |
| 9,251,020 B1 | 2/2016 | Kalekar |
| 9,280,423 B1 | 3/2016 | Mam |
| 9,292,520 B1 | 3/2016 | Madiraju Varadaraju |
| 9,298,561 B1 | 3/2016 | Sawhney |
| 9,355,098 B2 | 5/2016 | Sawdon |
| 9,391,865 B1 | 7/2016 | Thiam |
| 9,405,482 B2 | 8/2016 | Varadharajan |
| 9,424,136 B1 | 8/2016 | Teater |
| 9,430,332 B1 | 8/2016 | Bahadure |
| 9,483,357 B2 | 11/2016 | Karonde |
| 9,716,755 B2 * | 7/2017 | Borowiec ........... H04L 67/1097 |
| 2002/0191952 A1 * | 12/2002 | Fiore ........................ H04N 5/76 386/217 |
| 2002/0194205 A1 | 12/2002 | Brown |
| 2004/0078641 A1 | 4/2004 | Fleischmann |
| 2005/0193235 A1 | 9/2005 | Sandorfi |
| 2007/0220071 A1 | 9/2007 | Anzai |
| 2010/0076932 A1 | 3/2010 | Lad |
| 2010/0205370 A1 | 8/2010 | Ikawa |
| 2010/0215343 A1 | 8/2010 | Ikeda |
| 2011/0047340 A1 | 2/2011 | Olson |
| 2011/0125714 A1 | 5/2011 | Manson |
| 2012/0017114 A1 * | 1/2012 | Timashev ........... G06F 11/1469 714/15 |
| 2012/0331225 A1 * | 12/2012 | Jones .................... G06F 3/0605 711/114 |
| 2014/0181048 A1 | 6/2014 | Varadharajan |
| 2014/0181438 A1 | 6/2014 | Varadharajan |
| 2014/0195791 A1 | 7/2014 | Teli |
| 2015/0112939 A1 | 4/2015 | Cantwell |
| 2015/0112941 A1 | 4/2015 | Cai |
| 2015/0127804 A1 | 5/2015 | Kripalani |
| 2015/0199138 A1 * | 7/2015 | Ramachandran ..... G06F 12/122 711/103 |
| 2015/0363282 A1 * | 12/2015 | Rangasamy ........ G06F 11/2033 714/4.12 |
| 2015/0378843 A1 | 12/2015 | Nanivadekar |
| 2016/0070623 A1 | 3/2016 | Derk |
| 2016/0127307 A1 * | 5/2016 | Jain ....................... G06F 3/0619 709/245 |
| 2016/0232060 A1 | 8/2016 | Nanivadekar |
| 2016/0306558 A1 | 10/2016 | Varadharajan |
| 2017/0235642 A1 | 8/2017 | Madiraju Varadaraju |

\* cited by examiner iSCSI-BASED GRANULAR RESTORE/RECOVERY
602

VIRTUAL DISK PARSER
604

DEDUPLICATION READ APIs
606

DEDUPLICATION WRITE APIs
608

FIG. 6

CROSS-PLATFORM INSTANT GRANULAR RECOVERY FOR VIRTUAL MACHINE BACKUPS

CROSS-REFERENCE TO RELATED APPLICATIONS

The present application is related to U.S. patent application Ser. No. 14/686,438 filed Apr. 14, 2015 and entitled "Presenting Virtual Machine Backup Files for Block and File Level Restore," U.S. patent application Ser. No. 14/686,650 filed Apr. 14, 2015 and entitled "Mountable Container Backups For Files," U.S. patent application Ser. No. 14/686,468 filed Apr. 14, 2015 and entitled "Block Changes Framework for Delta File Incremental Backup," and U.S. patent application Ser. No. 14/686,400 filed Apr. 14, 2015 and entitled "Virtual Machine Block and Snapshot Consolidation," all assigned to the assignee of the present application, and each incorporated herein by reference in its entirety.

TECHNICAL FIELD

Embodiments are generally directed to networked-based data backup, and more specifically to restoring virtual machine backups across different operating system platforms using iSCSI protocols.

BACKGROUND

Backup and recovery software products are crucial for enterprise level network clients. Customers rely on backup systems to efficiently back up and recover data in the event of user error, data loss, system outages, hardware failure, or other catastrophic events to allow business applications to remain in service or quickly come back up to service after a failure condition or an outage. Data protection and comprehensive backup and disaster recovery (DR) procedures become even more important as enterprise level networks grow and support mission critical applications and data for customers.

The advent of virtualization technology has led to the increased use of virtual machines as data storage targets. Virtual machine (VM) disaster recovery systems using hypervisor platforms, such as vSphere from VMware or Hyper-V from Microsoft, among others, have been developed to provide recovery from multiple disaster scenarios including total site loss. Although disaster recovery procedures provide a reliable method of backing up critical enterprise data, most DR processes take a large amount of time to recover. Even in newer networks that utilize disk-based targets, the time to recover can remain significant, and may not meet the recovery time objectives (RTOs) and recovery point objectives (RPOs) of today's business needs. One main drawback is that during disaster recovery, present methods still require blocks to be copied from the virtual hard disk files (e.g., VHDx) to the host disks.

Providing availability of virtual machine backup files for instant system restore requires newer data restoration techniques. One common approach is to mount the virtual machine directly from the machine/server where the backup file is present. This involves the making the file on the remote machine accessible to the server via standard network-based file sharing protocols like CIFS/NFS (Common Internet File System/Network File System).

This requires additional configurations to be made on the remote machine side, thus adding significantly to administrative overhead. Furthermore, different backup platforms support different file sharing protocols. For example, Unix-based operating systems support NFS, while operating systems such as Microsoft Windows do not support NFS-based network file share protocols, but instead support the CIFS protocol. A popular backup platform, such as EMC Networker supports UNIX as a storage node to interface it from Windows-based systems, and thus require an interface to the NFS protocol, and Networker currently has support to interface with NFS servers via client library. However, resolving different network transfer protocols is a challenge for backup solutions that rely on network share through a specific file transfer protocol. It also requires additional configurations to be made on the remote machine side.

Previous solutions to this issue involved emulating virtual machine backup files present in the remote machine as if it were present on the local machine in a local volume that is formatted with a known file system, such as NTFS using native protocols like DDBoost for Data Domain systems or custom NFS client libraries for Unix storage servers. This approach involves a kernel mode volume redirector driver and a corresponding user mode process that handles the I/O requests from the kernel mode driver objects. Since this involves a kernel component (i.e., a driver to redirect I/O requests), the implementation and maintenance of drivers across multiple platforms and operating system versions is needed. The same solution must thus be reworked for newer or varied versions of each operating system. Furthermore, since this approach was designed for system recover scenarios, and these comprise a smaller number of volumes in a machine, scalability issues emerge with multiple large virtual machines in a Hyper-V system.

FIG. 1 is a diagram that illustrates the use of redirector drivers and corresponding user mode processes, as currently used in present systems. As shown in FIG. 1, a set of volumes 122 denoted volumes 1, 2, 3, ... N, each have respective virtual volume kernel objects 124 that reside in kernel mode 121. Each kernel mode volume object has a corresponding redirector process 126 that resides in user mode. The user mode redirector processes then communication with the remote host 128. For I/O operations, the user mode processes 126 handle the I/O requests from the kernel mode driver objects 124 for the remote host (e.g., Data Domain host) 128. In a system with a large number of virtual machines (e.g., 50 VMs or more) the implementation and maintenance of the kernel mode volume redirector drivers and corresponding user mode redirector processes imposes a significant time and processing overhead. FIG. 1 may illustrate an example case of a VHD/VHDx system having one partition/volume within the disk, and in which a backup manager includes user mode redirectors that process communications with the DD/remote host, and kernel mode volume redirector drivers that read the data volumes.

Given the drawbacks stated above with respect to present systems, what is needed, therefore, is an instant data recovery/restore method that does not require a network share of the remote virtual machine hard disk files and without changing the original backup files. What is further needed is an instant recovery/restore method that is scalable for different systems and recovery applications.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 is a block diagram illustrating functional components of an iSCSI server process implementing a granular recovery process, under some embodiments.

DETAILED DESCRIPTION

Figure 1:
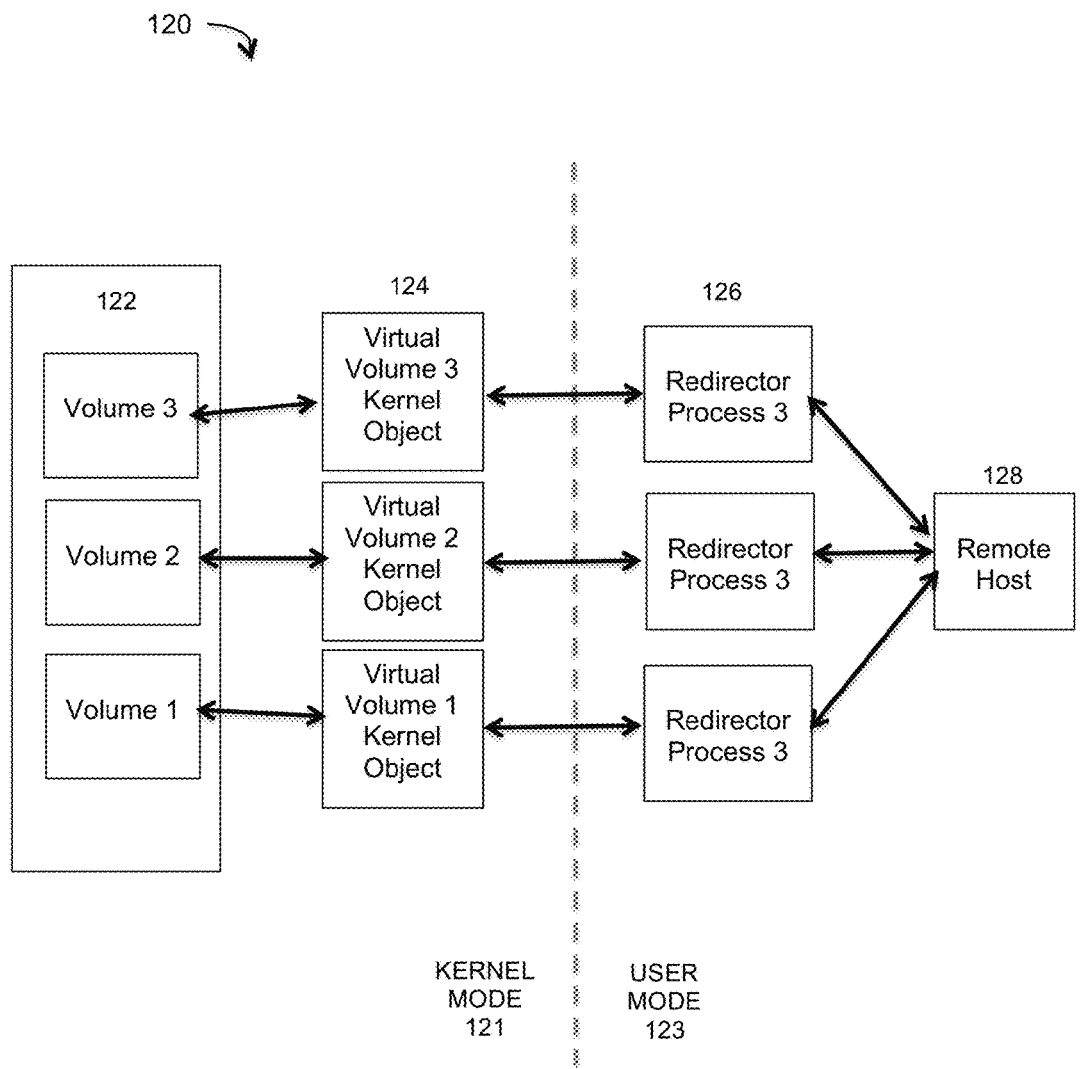
FIG. 1 is a diagram that illustrates the use of redirector drivers and corresponding user mode processes, as currently used in present systems.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Disclosed herein are methods and systems of performing data backup in a virtual machine network for VMs with virtual hard disk formats to provide a data recovery process that provides instant availability of VM backup files without requiring network share, and that can be used as part of a disaster recovery solution for large-scale networks.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 2:
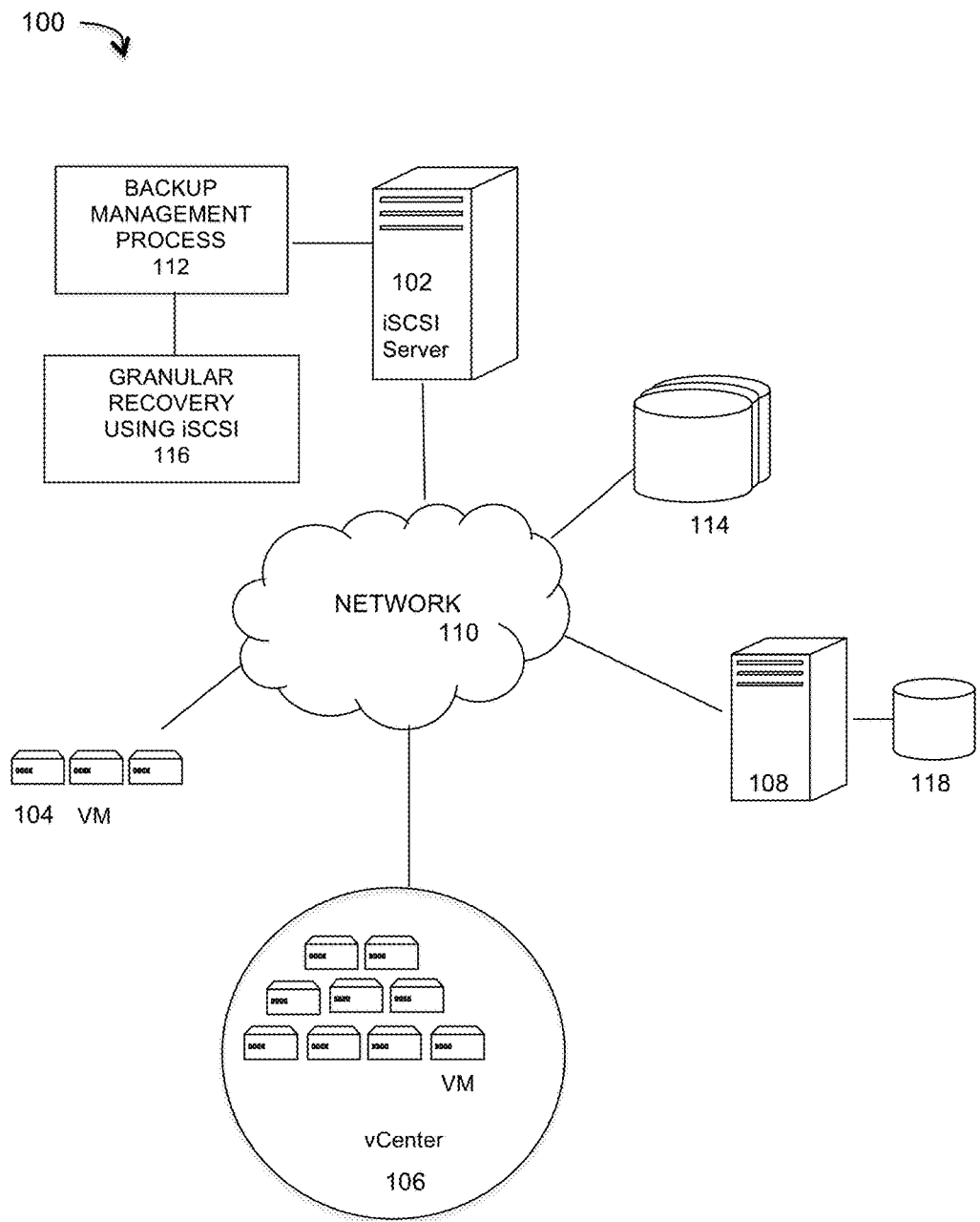
FIG. 2 is a diagram of a large-scale network implementing a data recovery process that provides instant recovery of virtual machine backup files by utilizing an iSCSI (Internet SCSI) protocol, under some embodiments.

FIG. 2 illustrates a computer network system 100 that implements one or more embodiments of an instant restore process for an automated disaster recovery and replication system for virtual machine (VM)-based backup systems. In system 100, a number of VMs or groups of VMs 104 are provided to serve as backup targets. Target VMs may also be organized into one or more vCenters 106 representing a physical or virtual network of many virtual machines (VMs), such as on the order of thousands of VMs each. The VMs serve as target storage devices for data backed up from one or more data sources, such as computer 108, which may have attached local storage 118 or utilize networked accessed storage devices 114. The data sourced by the data source may be any appropriate data, such as database data that is part of a database management system. In this case, the data may reside on one or more hard drives (118 and/or 114) and may be stored in the database in a variety of formats. One example is an Extensible Markup Language (XML) database, which is a data persistence software system that allows data to be stored in XML format. Another example is a relational database management system (RDMS) which uses tables to store the information. Computer 108 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

A network server computer 102 is coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118), or network storage (e.g., 114), which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity drive (optical or magnetic) arrays. In an embodiment, the target storage devices, such as disk array 114 may represent any practical storage device or set of devices, such as fiber-channel (FC) storage area network devices, and OST (OpenStorage) devices. In a preferred embodiment, the data source storage is provided through VM or physical storage devices, and the target storage devices represent disk-based targets implemented through virtual machine technology.

For the embodiment of FIG. 2, network system 100 includes a server 102 that executes a data backup/DR process with recovery capabilities based on data recover or data restore techniques. The management process 112 automates the backup and/or replication/restore of network data using the target VM devices. The instant restore process 116 provides for the ready and instant availability of virtual machine backup files without the use of file share protocols to access remote virtual machine hard disk files, and without changing the original backup file. The terms "restore" and "recovery" may be used interchangeably with regard to post backup operations.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well DD Boost provided by EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system, and DD devices generally support both NFS and CIFS protocol for accessing files. With respect to the NFS client protocol, operating systems such as Microsoft Windows may not support NFS based network file share protocol, but instead support the CIFS protocol. Since Networker supports UNIX as storage node, to interface it from Windows required interfacing with the NFS protocol. The EMC Networker platform supports an interface with NFS servers through a client library.

As is known, virtual machine environments utilize hypervisors to create and run the virtual machines. A computer running the hypervisor is a host machine and all virtual machines are guest machines running guest operating systems (OS). The hypervisor provides the guest OSs with a virtual operating platform and manages the execution of the VMs. In an embodiment, the backup management process 112 is configured to operate with the Hyper-V hypervisor, which is a native hypervisor that creates VMs on Intel x86-64 based systems and is an integral part of the Microsoft Windows server products. In general, Hyper-V implements isolation of virtual machines in terms of a partition, which is a logical unit of isolation, supported by the hypervisor, in which each guest operating system executes. A hypervisor instance has to have at least one parent partition. The virtualization stack runs in the parent partition and has direct access to the hardware devices. The parent partition then creates the child partitions which host the guest OSs. A parent partition creates child partitions using an API.

In an embodiment, system 100 represents a backup platform (e.g., EMC Networker) that supports block-based backups (BBB) of volumes and files in a virtual hard disk (VHD or VHDx) format. For this embodiment, the files to be backed up are virtual hard disk files that may be formatted as a VHD (Microsoft Virtual Hard Disk Image) or Microsoft VHDx file. The VHDx format is a container format, which can contain disk related information. VHDx files can be mounted and used as a regular disk. Volumes such as NTFS/ReFS/FAT32 or any file system which the OS supports on the mounted disk can also be created. Differencing VHDx's can be created which will have internal references to parent VHDx. In general, block based backups bypass files and file systems almost completely. The operating system file system divides the hard disk, volume or RAID array into groups of bytes called blocks (fixed size) or extents (variable size), which are typically ordered 0-N.

In a specific embodiment, the file is backed up as a virtual hard disk file that may be formatted as a VHD (Microsoft Virtual Hard Disk Image) or Microsoft VHDx file (a Microsoft Hyper-V virtual hard disk). The VHDx format is a container format which can contain disk related information. VHDx files can be mounted and used as a regular disk. Volumes such as NTFS (New Technology File System), ReFS (Resilient File System), FAT32 (32-bit File Allocation Table), or any file system, which the OS supports on the mounted disk can also be created. Differencing VHDx's can be created which will have internal references to the parent VHDx. Further discussion of the VHDx format is provided in "VHDX Format Specification," Version 0.95, Apr. 25, 2012, from Microsoft Corporation, and is incorporated by reference. The file to be backed up may be in any file format and the format may be the same as or different from the resulting backup file. For example, the file to be backed up may be formatted as a VHD/VHDx file, a Microsoft Exchange DataBase (EDB) file, a Microsoft SQL Server (MDF) file, Oracle database file (DBF), or any other file format.

Figure 3:
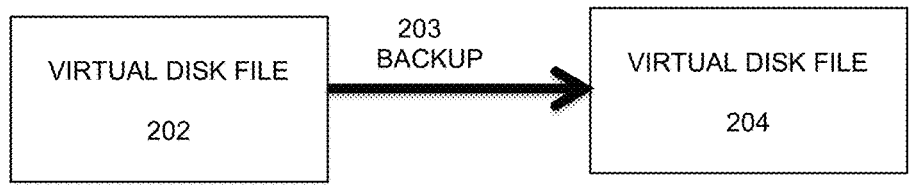
FIG. 3 illustrates an example virtual disk that may be used in a backup operation, in accordance with some embodiments.

FIG. 3 illustrates an example virtual disk that may be used in a backup operation, in accordance with some embodiments. As shown in FIG. 3, a volume may be configured to store information that needs to be backed up through a backup operation 203. For example, the volume may be associated with a database or repository or other data source, and may be referred to as a parent volume. In an embodiment, the backup process 112 backs up a virtual machine, which are represented as virtual disks. Thus, as shown in FIG. 3, virtual disk file 202 is backed up by operation 203 to virtual disk file 204. File 204 may be configured to store any and all back up information related to the virtual disk file 202. The file 204 may be created based on a virtual disk format and may contain information typically contained in a physical volume.

For some embodiments, the file 204 may be created based on the Hyper-V Virtual Hard Disk (VHDX) format according to the VHDX Format Specification, published by Microsoft Corp. The file 204 may be referred to as a VHDx file and may be mounted by an operating system that supports VHDx files. One example of such an operating system is the Microsoft Windows Server 2012 by Microsoft Corp. The file 204 may be configured to store full backup information of a parent volume (e.g., volume 202). For some embodiments, the backup operation that backs up the parent volume to the file 204 may be performed using a block based backup (BBB) operation. In a block based backup, the information may be read from the parent volume block by block regardless of the number of files stored in the parent volume. The backup operation may take an image of the parent volume without having to refer to the file system associated with the parent volume.

Figure 4:
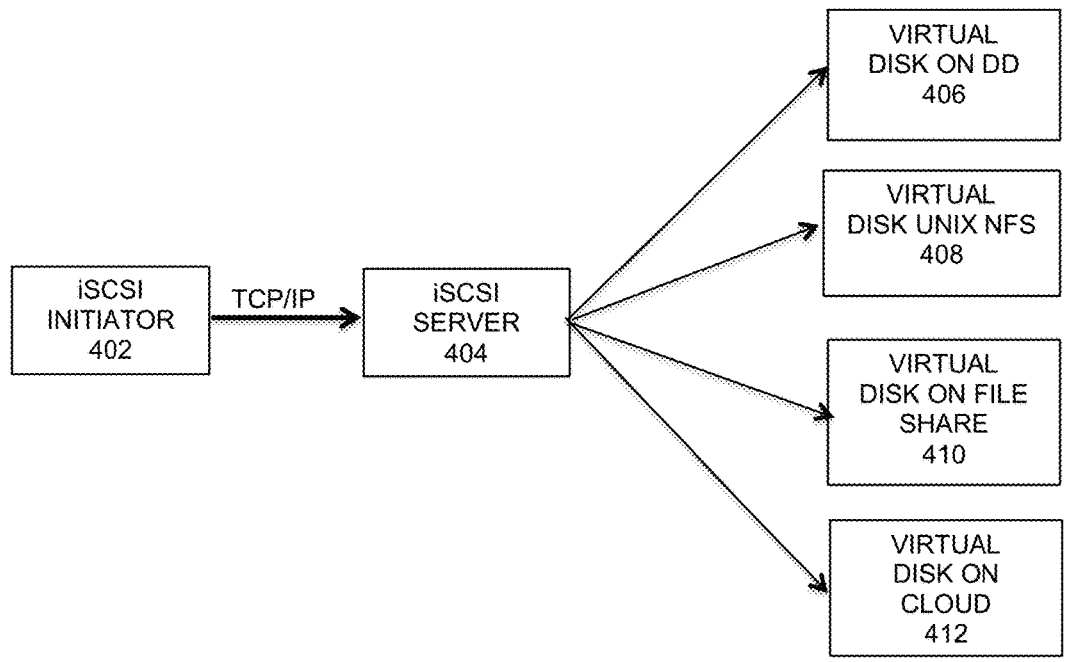
FIG. 4 illustrates an iSCSI architecture for use with a virtual machine restore/recovery process, under some embodiments.

As shown in FIG. 2, in an embodiment, server 102 is an iSCSI server, which uses the iSCSI protocol to serve iSCSI targets represented by virtual disk files that comprise the Hypervisor backups. In this embodiment, an iSCSI initiator provided by the operating system is used to connect to an iSCSI server capable of exposing virtual disks from the backup location. This is shown in FIG. 4, which illustrates an iSCSI network accesses virtual disks over a network. The iSCSI initiator 402 communicates with iSCSI server 404 over a TCP/IP network, which in turn accesses a variety of different virtual disk systems, such as Data Domain storage 406, UNIX NFS storage 408, file share virtual disk storage 410, and cloud-based virtual disk storage 412, among others.

In general, the iSCSI (Internet Small Computer System Interface) allows two hosts to negotiate and then exchange SCSI commands (CDBs) using IP networks. It thus works on top of the Transport Control Protocol (TCP) and allows SCSI commands to be sent end-to-end over local-area networks (LANs), wide-area networks (WANs) or the Internet. iSCSI works by transporting block-level data between an iSCSI initiator 402 on a server 404 and an iSCSI target on a storage device, e.g., 406 to 412. The iSCSI protocol processes the SCSI commands as packetized data for the TCP/IP layer. Received packets are disassembled and the SCSI commands are separated so that the operating system sees the storage as a local SCSI device that can be formatted as usual. For server virtualization techniques that use storage pools, the storage is accessible to all the hosts within the cluster and the nodes communicate with the storage pool over the network through the use of the iSCSI protocol. The iSCSI protocol can be used to take a high-performance local storage bus and emulate it over a wide range of networks, creating a storage area network (SAN) that does not require any dedicated cabling and can be run over existing IP infrastructure.

In an embodiment, standard SCSI commands, sent in a Command Descriptor Block (CDB), are used to implement aspects of the 116 restore process. The CDBs can be of any appropriate size and format, for example, a CDB can be a total of 6, 10, 12, or 16 bytes, or variable-length. The CDB may consist of a one-byte operation code followed by some command-specific parameters that conform to industry standard available commands.

For data storage applications, such as that shown in FIG. 2, the iSCSI server 102 is configured to access disk volumes on storage arrays that may be part of a SAN. This provides storage consolidation functions, as well as disaster recovery functions in which storage resources may be mirrored from one data center to a remote data center, which can serve as a hot standby in the event of a prolonged outage. Through the iSCSI protocol entire disk arrays can be migrated across a network with minimal configuration changes.

For the embodiment of FIG. 4, the initiator 402 functions as an iSCSI client and typically serves the same purpose to a computer as a SCSI bus adapter does by sending SCSI commands over an IP network. An initiator can be either a software initiator that uses program code to implement the iSCSI, such as through a kernel side device driver, or a hardware initiator that uses dedicated hardware to implement iSCSI. An iSCSI host bus adapter (HBA) implements a hardware initiator. An iSCSI target generally refers to a storage resource located on an iSCSI server and represents an instance of iSCSI storage nodes running on that server as a target. In a SAN, an iSCSI target is often a dedicated network-connected hard disk storage device, but may also be a general-purpose computer. For the embodiment of FIG. 2, the iSCSI targets resides in large storage arrays, such as VMs 104, vCenters 106 or RAID arrays 114. These arrays can be in the form of commodity hardware with or as commercial products such as EMCs VNX, VMAX, or other systems. A storage array usually provides distinct iSCSI targets for numerous clients.

SCSI devices are represented by individually addressable LUNs (logical unit numbers). In system 100, LUNs are essentially numbered disk drives. An initiator negotiates with a target to establish connectivity to a LUN, and the resulting iSCSI connection emulates a connection to a SCSI hard disk. Initiators treat iSCSI LUNs the same way as they would regular hard drive. Thus, rather than mounting remote directories as would be done in NFS or CIFS environments, iSCSI systems format and directly manage file systems on iSCSI LUNs. For the embodiment of FIG. 2, LUNs usually represent subsets of large RAID or VM disk arrays, often allocated one per client. Shared access to a single underlying file system is tasked to the operating system.

Using the iSCSI protocol, separate implementation and maintenance of kernel mode drivers and the corresponding user mode redirector processes (as shown in FIG. 1) is not required for different platforms and newer versions of the operating system. Also, scalability issues encountered with this previous approach are overcome.

In an embodiment, the restore/recovery process 116 uses the iSCSI protocol to provide granular recovery operation. This process emulates the virtual machine backup files present in the remote machine as if it were present on the local machine in a local volume which is formatted with a known file system; for example, NTFS using native protocols like DD Boost for Data Domain systems, and custom NFS client library for UNIX storage servers. In this embodiment, the iSCSI server 102 exposes iSCSI targets present as a virtual disk in the Data Domain system. The iSCSI server 102 is configured to mount an iSCSI target comprising a virtual disk, which is run on the computer where granular recovery is desired. This typically is the Hyper-V server, but can be any other computer. The iSCSI initiator component is available as part of the operating system that is used to connect to the iSCSI server 102. The iSCSI server exposes virtual disks (VHD/VHDX/VMDK, or other virtual disk format) backed up as part of the virtual machine backup, as a LUN to the connecting iSCSI client. In order to achieve this, SCSI reads from the virtual disk are performed using appropriate APIs, such as DD Boost APIs. The backup save set is now mounted as a local disk in the machine.

For purposes of description, the term "granular" refers to the granularity or size of the data set (saveset) that is stored and recovered or restored during backup and recovery operations. It generally refers to the level of detail characterizing backup data. For example, data may be stored at a block level, file level, message level, and so on. Backups may also be characterized by type, such as full, incremental, differential, and synthetic.

Figure 5:
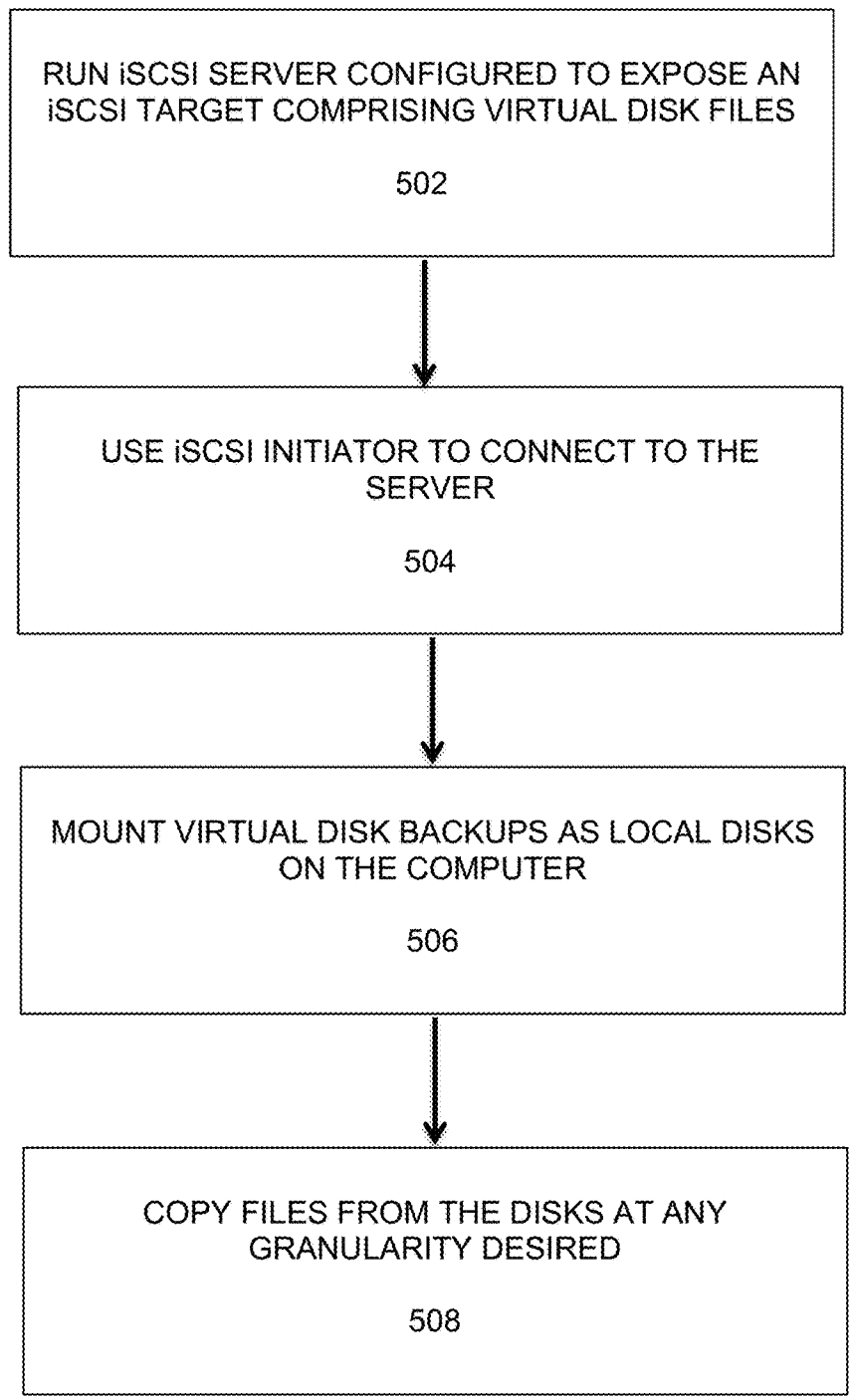
FIG. 5 is a flowchart that illustrates a method of using the iSCSI protocol to provide granular recovery, under some embodiments.

FIG. 5 is a flowchart that illustrates a method of using the iSCSI protocol to provide granular recovery, under some embodiments. As shown in FIG. 5, the process starts with the iSCSI server exposing the iSCSI target comprising virtual disk files, step 502. An iSCSI initiator is used to connect to the server (e.g., as shown in FIG. 4), step 504. The virtual disk backups are not mounted as local disks in the computer, 506. Files present in different volumes of the disk can be recovered to a desired location at any granularity desired, 508.

FIG. 6 is a block diagram illustrating functional components of an iSCSI server process implementing a granular recovery process, under some embodiments. As shown in FIG. 6, a granular restore/recovery functional component 602 (which at least in part may correspond to process 102 in FIG. 2) implements the iSCSI protocol and comprises a virtual disk parser 604 to convert SCSI disk R/W (read/write) offsets to virtual disk chain offsets. It also comprises certain appropriate deduplication APIs (e.g., Data Domain DD Boost APIs) to read from the virtual disk presents on the DD machines. SCSI write commands are served the deduplication write APIs 608. For a DD system, these can be ddp_write (Data Domain API) calls when a R/W mount is done.

Figure 7:
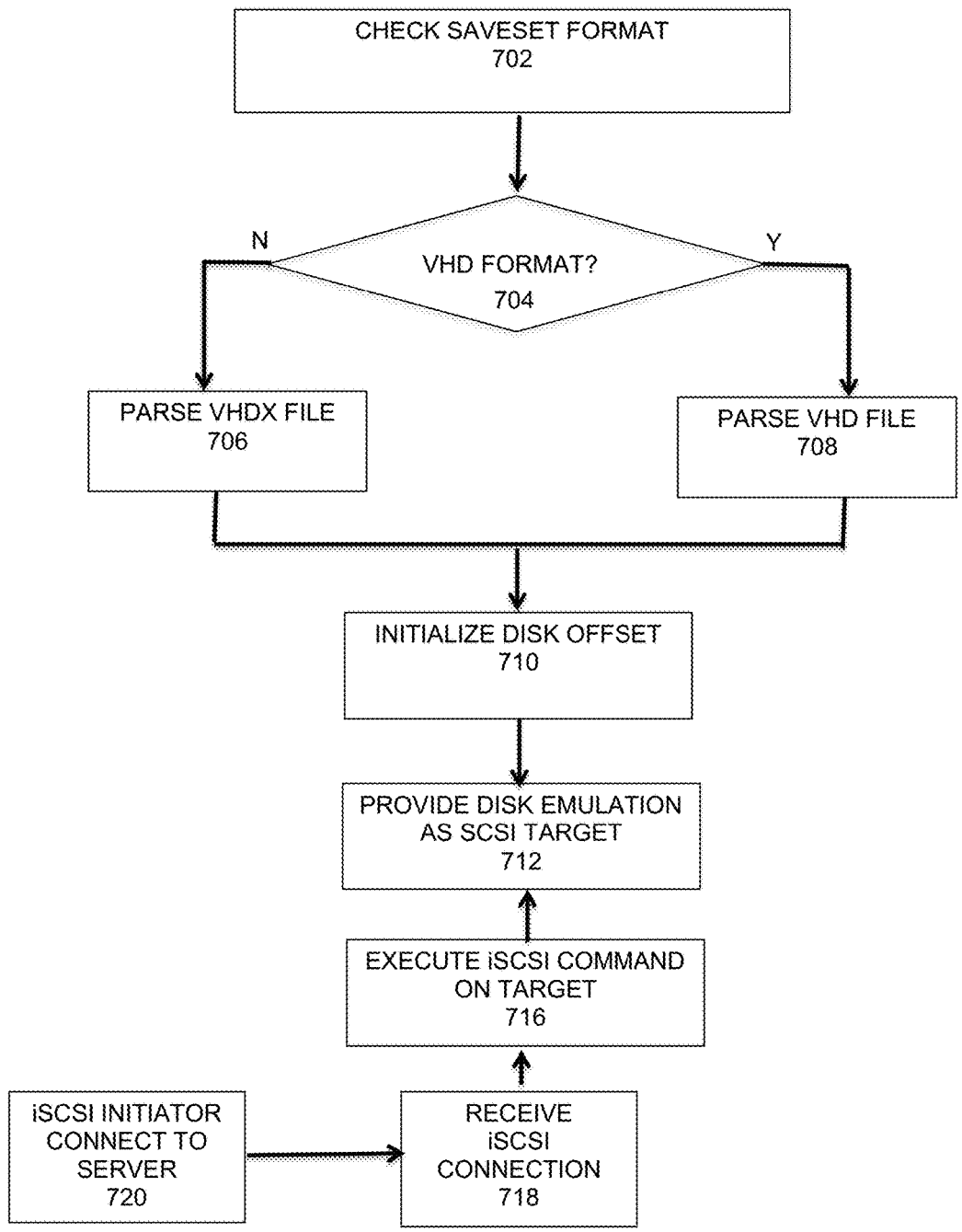
FIG. 7 is a flowchart that illustrates processing file commands in an iSCSI recovery process, under some embodiments.

FIG. 7 is a flowchart that illustrates processing file commands in an iSCSI recovery process, under some embodiments. As shown in FIG. 7, the process begins by checking the file format that was used during the storage operation to generate the data saveset, step 702. In decision block 704 it is determined whether or not the format is VHD. If so, the VHD file is parsed, 708; and if not, the VHDx file is parsed, 706. The process then initializes the disk offset, step 710, and provides disk emulation as a SCSI target, 712. From the iSCSI initiator end, the iSCSI initiator connects to the iSCSI server, step 720. The server receives the server connection, 718, and executes the SCSI command on the target, 716. This corresponds the disk emulation that was provided as a SCSI target in step 712.

Figure 8:
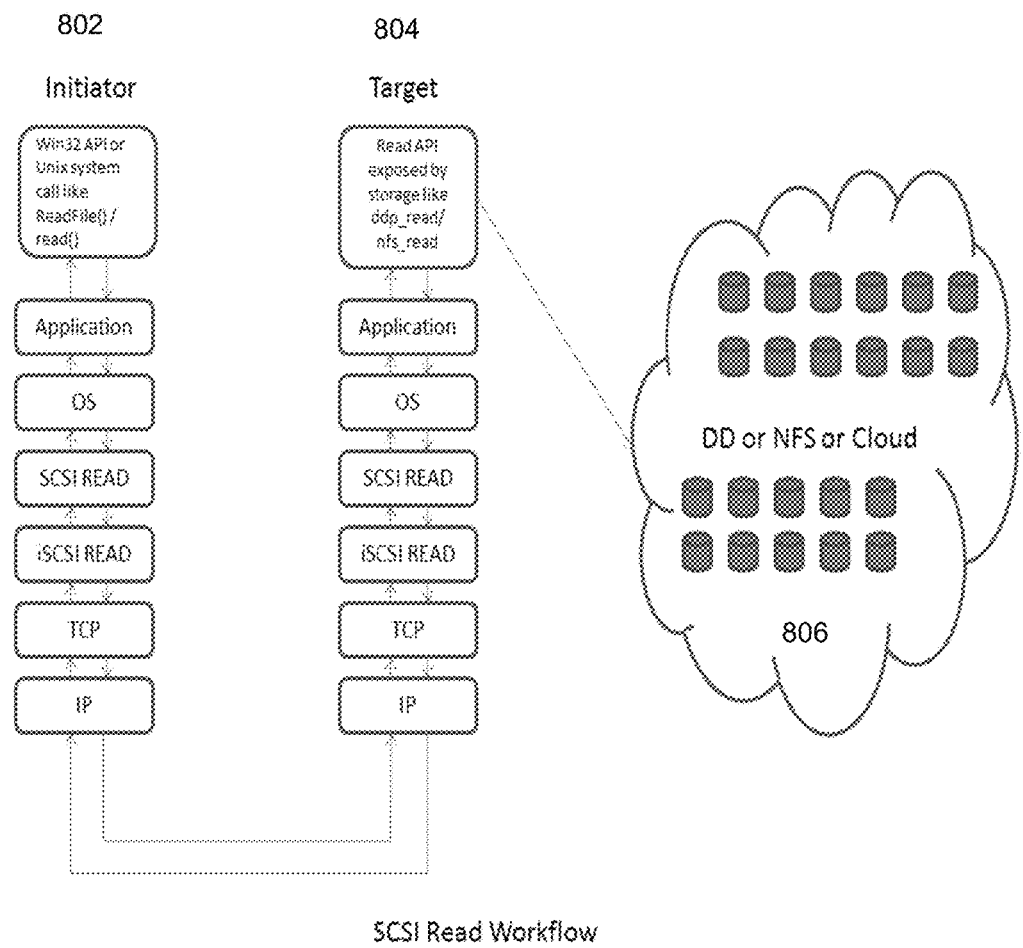
FIG. 8 is a flow diagram that illustrates a routing path of SCSI commands for a granular recovery process, under some embodiments.

FIG. 8 is a flow diagram that illustrates a routing path of SCSI commands for a granular recovery process, under some embodiments. FIG. 8 illustrates basic method steps executed among an initiator 802, a target 804, and network storage 806, which may be Data Domain, NFS, or cloud storage devices or disk arrays. As shown in FIG. 8, the initiator initiates a ReadFile( ) or read( ) or other appropriate read command or function call. This is transmitted to the application, which then uses the OS to execute the SCSI read operations over the TCP/IP layers for transmission to the target 804. The storage devices are exposed by the iSCSI server as part of the SAN, typically the virtual disks that are part of the virtual machine backup are exposed as a LUN to the connecting iSCSI target. The target 804 then accesses the storage devices 806 through appropriate read API calls, such as ddp_read/nfs_read, and so on. In this manner, FIG. 8 illustrates a routing path of a SCSI command for a read operation and shows how data is fetched from a virtual disk emulating a local disk.

An analogous process to that shown in FIG. 8 can be performed for SCSI write operations.

Embodiments of the granular recovery process using iSCSI protocol as described herein provides several advantages over present systems, including requiring no additional or new implementation for modified or new OS components or platforms. Likewise, no new implementation or maintenance is required for newer versions of an operating system. Through the use of file system parsers, disks thus exposed can be used to perform granular recovery across platforms. For example, with an NTFS parser on a Linux machine, granular recovery of a Windows virtual machine can be performed on a Linux version, or vice versa. The same techniques can be used to perform granular recovery of virtual machines from DD, NFS, Cloud or a file share. Other advantages include instant presentation of virtual machine backup file to the host in native file system, resulting in recovery operations that are instantaneous or near instantaneous, there is no need to hop through for recovery, and recovery is many times faster than legacy restore operations. The process can expose the file directly to any host, hence RTO objectives are met. The process takes advantage of iSCSI initiator provided by all standard operating systems, and provides efficient R/W mount of virtual machine hard disk files.

Although embodiments are described with respect to iSCSI systems, it should be noted that other transport protocols can also be adapted to use the recovery methods described herein, including Fibre Channel over Ethernet (FCoE), and other protocols that may implement processes like the iSCSI protocol. Likewise, although embodiments are described with respect to specific function names and code portions, it should be noted that these are provided primarily as examples and implementation within a certain versions of the UNIX or Windows operating systems, and embodiments are not so limited and cover other alternative function names, code portions, and OS implementations.

Although embodiments have been described with respect to certain file systems, such as NFS, CIFS, NTFS, and the like, it should be noted that embodiments are not so limited and other alternative file systems may also be used in conjunction with the described embodiments. Similarly different operating systems, hypervisor platforms, and data storage architectures may utilize different implementations or configurations of the described embodiments.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of providing granular recovery of virtual machine backups in a deduplication backup system having a server computer executing data backup and recovery processes between computers having disparate file systems, comprising:
    generating, in a processor of the server computer, the virtual machine backups comprising virtual disks that are configured as iSCSI targets, wherein the server computer exchanges Command Descriptor Block (CDB) SCSI commands to and from storage devices over an Internet Protocol (IP) network coupled to the server computer;
    exposing, through an iSCSI server process of the backup server, the virtual disks as a logical unit number to an iSCSI client;
    converting, in a virtual disk parser, SCSI disk read/write offsets to virtual disk chain offsets to emulate virtual machine backup files on a remote computer as present on a local computer in a local volume and formatted with a first file system of the disparate file systems;
    performing SCSI read operations from the virtual disk using defined application program interfaces (APIs); and
    mounting a backup save set comprising the virtual disk files as a local disk on a computer where data recovery is to be performed.

2. The method of claim 1 wherein the backup save set resides on one of a deduplication backup platform, a network file system, or a system that provides streaming read/write functionality.

3. The method of claim 2 further comprising performing a virtual disk mount operation in a mount process native to an operating system from where a connection is made to the iSCSI server.

4. The method of claim 3 wherein the virtual disk comprises a virtual machine that is formatted in one of a VHD, VHDx, or VMDK virtual disk format.

5. The method of claim 4 wherein the iSCSI server executes a data recovery operation at a granularity comprising one of: file level, directory level, or volume level granularity.

6. The method of claim 5 wherein the backup operation comprises one of: full backup, incremental backup, differential backup, and synthetic backup.

7. The method of claim 6 wherein the granularity can be achieved at one or more levels.

8. The method of claim 1 wherein the iSCSI server comprises a deduplication backup server, and wherein the APIs comprise Data Domain system interfaces.

9. The method of claim 4 wherein the granularity comprises a defined size and detail of a minimum individual saved data unit within the save set.

10. The method of claim 9 wherein the APIs comprise Data Domain system interfaces.

11. A computer program product, comprising a non-transitory computer-readable medium having a computer-readable program code embodied therein, the computer-readable program code adapted to be executed by one or more processors to facilitate recovery of a backed up save set for a backup system including virtual machine targets in a deduplication backup system having a server computer executing data backup and recovery processes between computers having disparate file systems, by executing instructions implementing a method comprising:
    generating, in a processor of the server computer, the virtual machine backups comprising virtual disks that are configured as iSCSI targets, wherein the server computer exchanges Command Descriptor Block (CDB) SCSI commands to and from storage devices over an Internet Protocol (IP) network coupled to the server computer;
    exposing, through an iSCSI server process of the backup server, the virtual disks as a logical unit number to an iSCSI client;
    converting, in a virtual disk parser, SCSI disk read/write offsets to virtual disk chain offsets to emulate virtual machine backup files on a remote computer as present on a local computer in a local volume and formatted with a first file system of the disparate file systems;
    performing SCSI read operations from the virtual disk using defined application program interfaces (APIs); and mounting a backup save set comprising the virtual disk files as a local disk on a computer where data recovery is to be performed.

12. The computer program product of claim 11 wherein the backup save set resides on one of a deduplication backup platform, a network file system, or a system that provides streaming read/write functionality.

13. The computer program product of claim 12 wherein the method further comprises performing a virtual disk mount operation in a mount process native to an operating system from where a connection is made to the iSCSI server.

14. The computer program product of claim 12 wherein the virtual disk comprises a virtual machine that is formatted in one of a VHD, VHDx, or VMDK virtual disk format.

15. The computer program product of claim 12 wherein the iSCSI server executes a data recovery operation at a granularity comprising one of: file level, directory level, or volume level granularity.

16. The computer program product of claim 12 wherein the backup operation comprises one of: full backup, incremental backup, differential backup, and synthetic backup.

\* \* \* \* \*